C. A. HOXIE.
METHOD OF AND APPARATUS FOR ELECTRICAL MEASUREMENT.
APPLICATION FILED NOV. 8, 1912.

1,176,559.

Patented Mar. 21, 1916.

Witnesses:
Margaret A. Delehanty
Lloyd C. Buck

Inventor:
Charles A. Hoxie,
By Charles McClair
Attorney.

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

METHOD OF AND APPARATUS FOR ELECTRICAL MEASUREMENT.

1,176,559. Specification of Letters Patent. Patented Mar. 21, 1916.

Application filed November 8, 1912. Serial No. 730,201.

*To all whom it may concern:*

Be it known that I, CHARLES A. HOXIE, a citizen of the United States, residing at Schenectady, county of Schenectady, State of New York, have invented certain new and useful Improvements in Methods of and Apparatus for Electrical Measurement, of which the following is a specification.

My invention relates to the art of electrical measurement, especially measurements involving the use of alternating or rapidly varying currents or potentials, and more particularly to a method of and means for measuring capacity and inductance in a simple and easy manner with an accuracy sufficient for all practical purposes.

Many kinds of measurements, as for example measurements of inductance and capacity, depend upon the flow of an alternating or rapidly varying current through a circuit of which the effective resistance depends upon the frequency or wave form of the current. Variations in the effective resistance of the circuit interfere with the measurements and should be avoided if possible. The various methods of measuring capacity and inductance heretofore proposed are essentially laboratory methods and require laboratory instruments, a great deal of time, and much tedious calculation. Such methods are of little value for measurements under commercial conditions, as commercial measurements must be made quickly, often by portable instruments and in the field, and the results must be obtained without long and tedious calculations.

One object of my invention is to provide a method and an apparatus by means of which measurements involving the use of alternating or rapidly varying current or potential may be made without being affected by variations in the frequency or wave form of the current used, or by iron losses, or other losses which vary the effective resistance of the circuit traversed by the current.

Another object is to provide a method of and an apparatus for measuring capacity and inductance directly on an easily read scale.

A further object is to provide a method and an apparatus which simplifies the measurement of inductance and capacity to such an extent that measurements of commercial accuracy may be made with as much ease and speed as equally accurate measurements of voltage or current can be made with the portable voltmeters and ammeters commonly used.

One valuable application of my invention is to methods and apparatus in which the measurements are affected by variations in the effective resistance of a circuit traversed by alternating, interrupted, or rapidly varying current and having an effective resistance dependent upon the frequency or wave form of the current, or upon the relative position of parts of the circuit.

By my invention the sensitivity of the instruments and the accuracy of the measurements by such instruments or methods are rendered independent of variations in frequency, wave form, and other variables, such as iron losses, which change the effective resistance of a circuit traversed by alternating, interrupted or rapidly varying current. This result is accomplished by providing suitable means for maintaining the effective resistance of that circuit constant, regardless of changes in the frequency or wave form of the current flowing through it, of changes in the relative position of parts of the circuit, or of anything which affects the effective resistance of that circuit; for example, if a circuit contains a variable inductance or similar device having a movable iron core, the effective resistance of that circuit depends not only upon the inductance produced by the position of the core, the frequency and wave form of the current used, and the ohmic resistance, but also upon the iron losses, which are principally due to hysteresis and eddy currents.

In accordance with my invention I provide a suitable compensator, such as a variable resistance connected in the circuit and variable at will, for enabling the operator to keep the effective resistance of the circuit constant and thereby eliminate errors due to variations in its effective resistance. This feature of my invention is of especial value in methods and apparatus involving the use of variable inductance containing iron, but is not limited to such measurements and may be used with advantage in any method or apparatus in which the measurement is in any way dependent on the effective resistance of a circuit subjected to alternating or rapidly varying potential and having iron in inductive relation to it.

The usual methods of determining inductance and capacity heretofore used are slow, require much calculation, and depend upon the use of standard condensers which are not suitable for commercial use in portable instruments, as they are bulky, are not easily transported, and are too delicate to withstand the rough usage and trying conditions incident to measurements made in the field, where the apparatus is unavoidably subjected to varying conditions and hard usage. On the other hand the inductance of a suitably constructed coil can be calculated and measured very accurately; in various ways its inductance can be varied easily and accurately to a known extent and if the coil is well made its inductance remains constant even under rough usage. In accordance with my invention I make a portable instrument having as a standard of comparison a rugged standard inductance easily variable to a known extent and practically unaffected by the rough usage to which a portable instrument is subjected by use in the field.

My invention, which is more fully described hereinafter and is pointed out with particularity in the appended claims, will be better understood in connection with the accompanying drawings, which, merely for purpose of illustration, show one of the various forms in which my invention may be embodied, and in which—

In the preferred form of instrument for carrying out my invention some non-inductive resistances and an inductance variable at will are arranged to form the arms of a Wheatstone bridge. The various parts of the instrument are suitably mounted in a box, such as a rectangular wooden box of a size and strength suitable for a portable instrument. This box protects the parts of the instrument, and is provided with suitable terminals and binding posts for connecting it to a source of potential and also for connecting to it the unknown capacity or the unknown inductance.

Figures 1, 4:
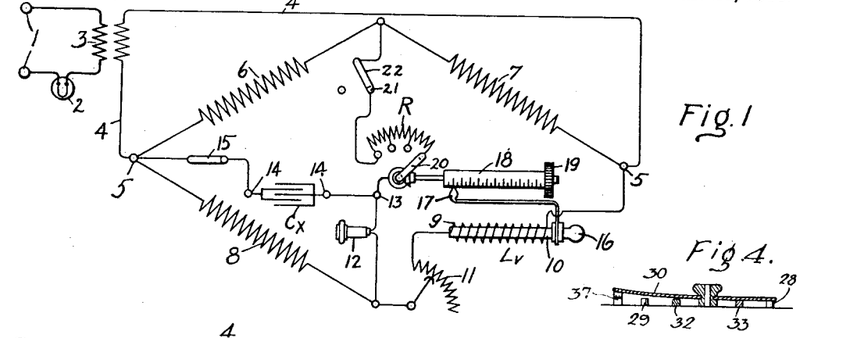
Figure 1 is a simplified diagram showing only those parts and circuits used in measuring capacity.
Fig. 4 is a detail view of certain features of the construction.

My invention will be understood most easily by referring to Fig. 1, which shows, in an instrument for measuring either capacity or inductance, only those connections and parts used for measuring capacity. The instrument shown in this figure is intended to be connected directly to some source of rapidly varying potential such as an alternating current circuit. If such a source is not available the potential applied to the instrument can be made to vary rapidly in any suitable and well known way, or may be rapidly interrupted by means of a suitable interrupter. In practically all places where the instrument will ordinarily be used alternating current is available and no special appliances or attachments to vary or interrupt the potential will be necessary, as the instrument will measure accurately with alternating current of any commercial frequency. The instrument is connected to the source of potential by means of binding posts 1, which are connected inside the box through an indicator, such as an incandescent lamp 2, to a transformer 3, which through leads 4 impresses an alternating or rapidly varying potential of the proper amount upon the common terminals 5 of two circuits connected in parallel between said terminals to form a Wheatstone bridge. One of these circuits consists of two non-inductive resistances 6 and 7 connected in series between said terminals 5, while the other consists of a noninductive resistance 8 connected in series with a variable inductance $Lv$, of which the inductance can be varied at will in any suitable way. It is essential in a portable instrument that the variable inductance be very compact and the possible variation in the inductance should be great, so that the instrument will have a wide range. To obtain these desirable properties the variable inductance must contain iron, which is preferably mounted close to the coils of the inductance in such a manner that the iron and the coils are relatively movable. The variable inductance $Lv$ is preferably constructed of a coil 9 provided with an iron core 10 mounted to slide longitudinally of the coil. The inductance of the coil is easily varied by varying the relative position of the coil and the core. The variation in the inductance of the coil is dependent upon the extent of movement of the core and can easily be measured.

The movement of the iron core 10 in the coil 9 to vary the inductance of the variable inductance $Lv$ also varies the iron losses in the core, and consequently varies the effective resistance of the arm containing the variable inductance. The effective resistance of this arm is also varied by changes in the frequency or wave form of the current through it. I therefore provide means for maintaining the effective resistance of that arm constant, regardless of resistance due to said iron losses. The means I prefer to use is a compensating variable resistance connected to the bridge in such a manner that the effect on the bridge of an increase or decrease in the effective resistance of the arm containing the inductance Lv can be counteracted and the bridge brought back to its original condition by varying the compensating resistance. In the preferred construction a compensating resistance 11 is connected in series with the inductance Lv to form part of the arm of the bridge and may be varied at will to add resistance in case the effective resistance of the inductance Lv decreases, or vice versa, so that the effective resistance of the arm as a whole is kept constant and the sensitivity of the instrument maintained at a maximum. Unless some means is provided for keeping the effective resistance of the arm constant the effects produced in the bridge by the inductance and the capacity are so obscured and interfered with by the effects due to changes in the effective resistance that rapid and accurate measurements are very difficult to make; for example, if a telephone is used as an indicator, the sound will show very clearly and definitely when the inductance and the capacity in the bridge counteract each other, as long as the resistance of all of the arms of the bridge is unchanged; but if the effective resistance of one of the arms changes, the telephone is affected by those changes, as well as by the effect of the inductance and of the capacity, and the result is a confused sound which makes it very difficult to determine what was easily determined before the effective resistance changed.

The effective resistance of any circuit which is traversed by alternating, interrupted or rapidly varying current and which is in inductive relation to iron depends upon the frequency and wave form of the current and upon the losses in the iron. Such circuits are used in many methods of measurement and in many different kinds of instruments where variations in the effective resistance of the circuit introduce disturbing factors into the measurements. My invention, so far as it relates to maintaining the effective resistance constant or to compensating for changes in the effective resistance of such circuits, may be applied to all such methods and instruments with advantage, and is not limited to the particular method and instrument herein disclosed.

Whether the Wheatstone bridge formed by the resistances 6, 7, 8 and the variable inductance Lv is in or out of balance is determined by means of a bridging circuit extending across the bridge from the junction of the resistances 6 and 7 to the junction of the resistance 8 and the variable inductance Lv. This bridging circuit contains some suitable indicator, such as a telephone, an alternating current galvanometer or similar device. I prefer to use a telephone 12 which is connected to the junction of the resistance 8 and the variable inductance and also to a point 13, which in turn is connected to the junction of the resistances 6 and 7 through a calibrating resistance R by means of which the range of the instrument may be varied. The sound in the telephone gives the desired indications as to the conditions in the bridge.

The unknown capacity is connected in any suitable way in shunt to the resistance 6 and in series with the calibrating resistance R, preferably by being connected to one of the terminals 5 and to the point 13 of the bridging circuit. The preferred construction is that shown, in which two binding posts 14 are provided, one connected to the point 13 and the other through a switch 15 to the terminal 5 or some other suitable point at the end of the resistance 6. When an unknown capacity, represented by the condenser Cx, is connected to the binding posts 14 it is in shunt to the resistance 6 and is in series with the calibrating resistance R, which is connected between the unknown capacity Cx and the junction of the resistances 6 and 7.

Even though the effective resistance of the arm containing the variable inductance Lv is of the proper amount as compared with the resistance of the arms 6, 7 and 8, the inductance of the variable inductance Lv prevents the bridge being in balance as long as there is no capacity connected to the bridge to counteract the inductance. When an unknown capacity is connected to the binding posts 14, it is in shunt to that arm of the bridge diagonally opposite the variable inductance Lv, and the capacity thus introduced tends to counteract the inductive effect of the inductance Lv. The bridge may now be practically balanced if the proper relation between the amount of the inductance Lv and the value of the capacity Cx is established. This relation may be established by varying the position of the core 10 of the variable inductance Lv, thereby varying the amount of the inductance in the circuit until the effect of the unknown capacity Cx is counteracted and the bridge is in balance.

The amount of variation in the variable inductance Lv may be measured in any suitable way. The core 10 is conveniently moved by means of a handle 16 on the end of the core. The extent of movement of the core 10 is preferably measured by providing it with a pointer 17 which moves over a suitable scale on which the movement of the core can be read directly. This scale is calibrated to read directly in terms of capacity. Any one of a number of scales may at will be brought under the pointer by rotating upon its axis a scale carrying member 18 provided with a number of scales and mounted in proper relation to the pointer 17. For rotating the scale carrying member 18 I provide some suitable means such as a disk 19 with its edge projecting through the top of the box. By taking hold of the edge of this disk the operator can conveniently rotate the disk and scale carrying member at will.

In order to make the instrument measure correctly on any scale which is brought under the pointer by the rotation of the scale carrying member some suitable means controlled by the scale carrying member is provided for automatically adjusting the range of the instrument to make its indications correspond to the particular scale which is then associated with the pointer 17. The preferred means for adjusting the range of the instrument comprises the calibrating adjustable rheostat or resistance R in the bridging circuit. This calibrating resistance is divided into sections corresponding to the different scales on the scale carrying member 17. The range of the instrument is varied by cutting into or out of circuit one or more of the sections of the resistance by means of an arm 20 actuated by the scale carrying member 18 and movable over a series of contacts connected to the sections of the resistance R.

In the particular arrangement shown in the drawings the scale carrying member has four sides, with a different scale on each side and the resistance R is provided with four corresponding contacts. In the position of the parts shown in Fig. 1, with the arm 20 on the first contact, all of the resistance of the calibrating resistance R is cut into circuit. If the scale carrying member is rotated to bring the next scale into operative relation with the pointer, the arm 20 is simultaneously moved to the second contact, thereby cutting out of circuit one of the sections of the resistance R; if the scale carrying member is rotated another step the arm 20 moves on to the third contact and two sections of the resistance are cut out of circuit, and so on. The sections of the resistance are so proportioned that in each case the indications of the instrument correspond with the scale which is then beneath the pointer. As long as the instrument is being used to measure capacity the bridging circuit is completed from the calibrating resistance R to the junction of the resistances 6 and 7 through a contact 21 engaged by a switch blade 22, which in turn is connected through a suitable lead to the junction of the resistances 6 and 7.

My method of measuring capacity by means of the instrument above described is as follows: The unknown capacity Cx is connected in shunt to one arm of the bridge by means of the binding posts 14, which are in series with the switch arm 15. An alternating or rapidly varying potential is then applied to the common terminals 5 of the bridge. The core of the variable inductance is now moved and the compensating resistance is varied until the sound in the telephone 12 denotes a balance. In some cases the sound becomes inaudible, and in others the character of the sound changes sharply, but in all cases a sharp indication is secured. The position of the core is then read off the scale and the value of the unknown capacity Cx becomes known, as the scale is graduated to read directly in terms of capacity of the capacity Cx.

Where the unknown capacity is beyond the range of the instrument when set as shown in Fig. 1 the scale carrying member is turned to bring the next greater scale into place beneath the pointer 17, and at the same time the arm 20 of the calibrating resistance R is automatically shifted so that one of the sections of the resistance is cut out of circuit. If this scale is not great enough the next is brought into place, and so on, until a scale is found on which the unknown capacity can be measured directly by the movement of the core 10, whereupon the measurement can be made as quickly and accurately as voltage or current can be measured by the instruments in common use for that purpose.

Figures 2, 3:
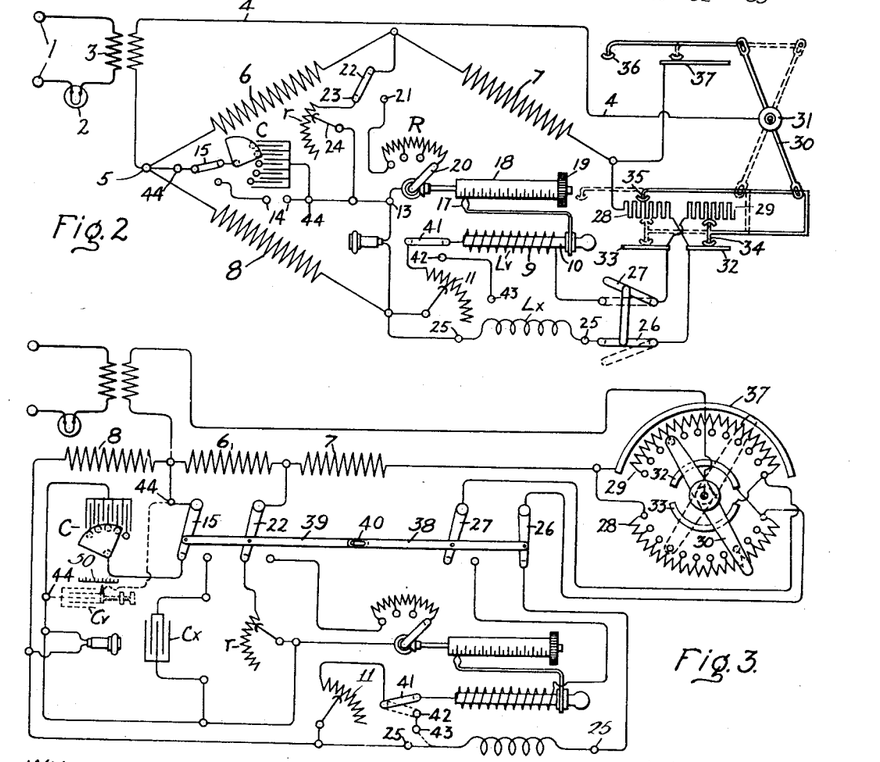
Fig. 2 is a simplified diagram showing all the circuits with the parts set for use in measuring inductance.
Fig. 3 is a diagrammatic view of the circuits and parts as arranged in the preferred form of instrument.

The instrument as used for measuring inductance will best be understood by referring to Fig. 2, which is a diagram showing all the parts and circuits of the instrument, with the instrument set for one method of measuring inductance. Those parts of the instrument which have already been considered in connection with Fig. 1 are marked with the same reference characters as in Fig. 1, and as will presently appear most of those parts are also used in the measurement of inductance.

As long as the instrument is used to measure inductance that arm of the bridge including the resistance 6 is permanently shunted by a capacity, such as a condenser C, connected between the terminal 5 and the point 13 on the bridging circuit by means of the switch 15. This switch was moved from the position shown in Fig. 1 to the position shown in Fig. 2 when the instrument was set for measuring inductance. In the method of measuring inductance now being considered, the condenser C is preferably, though not necessarily adjustable, and is so constructed that when the controlling member of the condenser is moved from its zero position to the next the capacity is increased tenfold, so that movement of the controlling member effects an adjustment of the capacity in the ratio of units, tens, hundreds and so on, as this proportioning of the condenser varies the range of the instrument in a desirable and simple manner.

Variations in the effect of the condenser C are produced by means of a variable resistance $r$, which is connected into the bridging circuit by shifting the switch 22 from the contact 21 to a contact 23 in series with the variable resistance. This resistance $r$ is controlled by a movable arm 24, by means of which more or less resistance may at will be introduced between the point 13 in the bridging circuit and the junction of the two resistances 6 and 7. The switch blade 22 remains on the contact 23 all the time the instrument is being used to measure inductance.

I provide means for at will making either the variable inductance $Lv$ or an unknown inductance $Lx$ act as that arm of the bridge which is diagonally opposite the arm shunted by the capacity C, and also for interchanging these inductances easily and quickly. I also provide as well for quickly and easily making the necessary adjustments for balancing the bridge in such a manner that either the unknown inductance or the variable inductance can be used as the arm of the bridge without disturbing the ohmic balance. Very many different arrangements can be used for securing the desired results, but the preferred arrangement is that shown, in which binding posts 25 are so arranged that the unknown inductance $Lx$ can be connected therebetween, and, by means of a switch 26, at will connected as that arm of the bridge diagonally opposite the arm shunted by the capacity C. A similar switch 27 enables the variable inductance to be connected as that arm of the bridge diagonally opposite the arm shunted by the capacity C. The switches 26 and 27 are interlocked to permit either the variable inductance or the unknown inductance to be connected in as the arm of the bridge, but prevent both being connected at the same time, so that the two inductances can be interchanged at will merely by moving the two switches.

The parts are so proportioned that the bridge is in ohmic balance when the variable inductance is at zero position. If the unknown inductance has less ohmic resistance than the variable inductance, some resistance added in series with the unknown inductance will bring the bridge into ohmic balance. The ohmic resistance of the unknown inductance may be greater than the ohmic resistance of the variable inductance. In this case the bridge can be brought into ohmic balance, when the unknown inductance forms one arm, only by adding to the adjoining arm, which includes the noninductive resistance 7, some extra resistance equal in amount to the excess of the resistance of the unknown inductance over the resistance of the known variable inductance. In this latter case, substitution of the variable inductance for the unknown inductance throws the bridge out of ohmic balance until enough resistance has been put in series with the variable inductance to compensate for the extra resistance which was added to the adjoining arm comprising the resistance 7. When the variable inductance forms one arm of the bridge, the bridge is in ohmic balance when neither the resistance 7 nor the variable inductance has any extra resistance in series with it, but when extra resistance has been put in series with the resistance 7, for the purpose just mentioned, the bridge can be brought back into ohmic balance, when the variable inductance forms one arm thereof, only by adding in series with the variable inductance the same amount of extra resistance as was added in series with the resistance 7. In order to facilitate balancing of the bridge under all conditions I provide means whereby a movement of a switch arm or member in one direction puts extra resistance in series with the unknown inductance only, so that the ohmic resistance of the unknown inductance plus the extra resistance equals the ohmic resistance of the variable inductance, whereupon the two inductances can be interchanged without disturbing the ohmic balance of the bridge. A movement of the arm or member in the opposite direction puts in series with the resistance 7 whatever amount of extra resistance is needed to produce an ohmic balance of the bridge when the unknown inductance constitutes one arm of the bridge, and at the same time automatically puts an equal amount of extra resistance in series with the variable inductance, so that when the interchange is made and the variable inductance is substituted for the unknown inductance no adjustment is necessary to bring the bridge into ohmic balance. Various arrangements may be used to make these adjustments in the desired order, but the construction which I prefer is a balancing rheostat shown diagrammatically at the right end of Fig. 2 and in detail in Fig. 3. As appears from the diagram of the right end of Fig. 2, the essential parts of the balancing rheostat are two extra resistances 28 and 29 controlled by a movable arm or member 30 provided with a handle 31 and connected to the lead 4. One end of the extra resistance 28 is connected to the resistance 7; the other end is connected to a contact bar 32 and to the switch 26, through which both the end of the resistance 28 and the contact bar 32 are connected to the unknown inductance. The other extra resistance 29 is connected to a metal contact bar 33 and to the switch 27 through which the end of the resistance 29 and the contact bar 33 are connected to the variable inductance $Lv$.

In the switch as actually constructed and as shown in Fig. 3, the ends of the movable contact arm 30 slide over and engage the extra resistances and the contact bars. In order to facilitate understanding of the invention I have shown at the right end of Fig. 2 a diagram of this switch, with the parts rearranged and the functions of the ends of the arm 30 performed in the diagram by metal sliders which are shown merely to facilitate understanding of the diagram. In this diagram in Fig. 2 I show a metal slider 34 mounted to slide over both the two extra resistances 28 and 29 and the two contact bars 32 and 33 and a second slider 35 mounted to slide over the extra resistance 28. Both these sliders are moved by the lower end of the member 30. The upper end of the member 30 is shown in the diagram as moving a slider 36, mounted to move over a contact bar 37 which is connected to the end of the resistance 7. In the rheostat as actually constructed and as shown in Fig. 3 the ends of the member 30 take the place of these three sliders and perform their functions.

When the member 30 is swung by means of the handle 31 in a clockwise direction into the position shown in dotted lines the slider 36 moves to the right over the contact bar 37 and connects the noninductive arm or resistance 7 directly to the lead 4. At the same time the right hand end of the extra resistance 28 is put in series with the unknown inductance $Lx$ by the slider 34 moving over part of the resistance 28 to the left, so that current can flow to the unknown inductance only by flowing to the slider 34 and thence through part of the resistance 28 to the contact bar 32 and the switch 26. This movement of the slider 34 over the resistance 28 does not put any resistance in series with the variable inductance $Lv$, as the other end of the slider moves over the metal contact bar 33 which is connected to the variable inductance. By this movement the required amount of extra resistance can be put in series with the unknown inductance $Lx$ when it is found that the ohmic resistance of the unknown inductance is less than that of the variable inductance $Lv$.

When it is found that the ohmic resistance of the unknown inductance is greater than that of the variable inductance the member 30 is moved in a counter clockwise direction, as, for example, to the position shown in full lines. Here the slider 34 is in engagement with the extra resistance 29 and the contact bar 32, so that current can flow direct from the slider through the contact bar to the unknown inductance, but can flow to the variable inductance only by passing through that part of the extra resistance 29 which is to the left of the slider 34. In this way some of the extra resistance is put in series with the variable inductance $Lv$. At the same time an equal amount of extra resistance is put in series with the noninductive arm or resistance 7, as the counter clockwise movement of the member 30 also draws the slider 35 to the right over the extra resistance 28 a distance equal to the distance the slider 34 has moved over the extra resistance 29. During this movement the slider 36 is off the contact bar 37, so that the only way for current to go to the noninductive resistance 7 is from the slider 35 through part of left end of the extra resistance 28 and thence to the resistance 7. The counter clockwise movement of the member 30 therefore puts equal amounts of the extra resistance in series with the variable inductance $Lv$ and with the resistance 7. When this has been done the bridge remains in ohmic balance, even though the variable inductance and the unknown inductances are interchanged.

In the particular form of device shown in Fig. 3 the movable member 30 is made in the form of a flexible metal blade mounted to rotate about an axis, the extra resistances 28 and 29 being made in the form of arcs of a circle of which the axis of the blade 30 is the center. The source of supply is connected directly to the movable member 30 and current is supplied to the unknown inductance and to the variable inductance through the contact bars 32 and 33, respectively, which are made in the form of arcs of a circle about the axis of rotation of the movable member 30 and are connected directly to the circuits containing the two inductances. The contact bar 37 is also made in the form of an arc of a circle and is mounted adjacent the extra resistance 29 and projects above the surface of the extra resistance. One end of the member 30 extends beyond the contact bar 37, but the other end does not reach to the contact bar. When the movable member 30 is swung in a clockwise direction into the position shown in dotted lines, its upper or long end rides upon the contact bar 37 and is thereby lifted out of engagement with the extra resistance 29, as will be best seen in Fig. 4 of the drawings. This corresponds to the position in Fig. 2 when the contact 36 is on the contact bar 37, as shown in dotted lines. The connection is now made directly to the resistance 7 and the extra resistance 29 is cut out of circuit. When the movable member is swung somewhat more than a half turn in a counter clockwise direction it comes into the full line position of Fig. 3, where its other end does not quite reach the contact bar 37 and therefore the movable member engages both the extra resistances and both of the contact bars 32 and 33. The ends of the movable member 30 coöperate with the contact bars and extra resistances in the same manner as the sliders shown in the diagrammatic view of Fig. 2 and establish the same connections as the sliders.

In order to insure that the connections are properly made the switches 26 and 27 are interlocked with the switches 22 and 15 by means of a lost motion connection which permits the switches 22 and 15 to be moved without affecting the switches 26 and 27 but which compels the switches 22 and 15 to move into the inductance measuring position when the switches 26 and 27 are operated to measure inductance. Various forms of interlock may be used to secure this result but a simple and preferred form is that shown in the drawing in which the lost motion connection comprises a rod 38 connected to the switches 26 and 27 and a rod 39 connected to the other two switches. These rods are connected by a pin and slot lost motion connection 40 which permits the switches 22 and 15 to be thrown into position to measure capacity without affecting the other switches, but which automatically throws the switches 22 and 15 into the inductance measuring position as soon as the switches 26 and 27 are moved to substitute the unknown inductance for the variable inductance. In this way the desired changes in connections are made automatically by simply turning the handle to throw the switches 26 and 27 and no skill in manipulating a number of independent switches need be required.

The method of measuring inductance by the means shown is as follows: The parts are so proportioned that when the variable inductance is in zero position the bridge is in ohmic balance and practically no current is flowing in the bridge wire. The unknown inductance is now connected to the terminals 25 and the switches 26 and 27 are turned by means of the handle so as to cut out the variable inductance and connect in the unknown inductance as one arm of the bridge. If the unknown inductance is of less ohmic resistance than the variable inductance enough of the extra resistance is put in series with the unknown inductance to effect the ohmic balance of the bridge. This is accomplished by turning the handle 31 and movable member 30 in a clockwise direction, whereby, as above described, the resistance is put in series with the unknown inductance but no change is made in the resistance of the circuits containing the variable inductance and the non inductive resistance 7. When the current through the bridge wire has been reduced as much as possible by the adjustment of the resistance inserted in series with the unknown inductance the bridge is in ohmic balance. The pure inductance of the unknown inductance must now be neutralized by capacity in the diagonally opposite arm of the bridge, and to this end the switch 24 is moved to adjust the capacity current until the effect of the capacity just neutralizes the effect of the inductance in the diagonally opposite arm of the bridge and the flow of current through the bridge wire is thus reduced to a minimum. In practice it is generally more convenient to alternately move the switch arms 30 and 24 until the indicator, such as the telephone, shows the flow of current through the bridge wire to be a minimum. When in this manner the flow of current through the bridge wire has been reduced to a minimum the switches 26 and 27 are thrown in the other direction, thereby cutting out the unknown inductance and substituting for it the variable inductance. When the variable inductance is substituted for the unknown inductance, its ohmic resistance is the same as the ohmic resistance of the unknown inductance but the bridge will not be in balance until the inductance in the variable inductance $Lv$ is rendered the same as that of the unknown $Lx$. This is accomplished by moving the core 10. By this movement of the core enough of the variable inductance $Lv$ is introduced into the arm of the bridge to reduce the flow of current in the bridge wire to a minimum, which is the same effect as was produced by the inductance of the unknown inductance $Lx$, consequently the inductance of the variable inductance $Lv$, as measured upon the scale 18, which was necessary to balance the bridge equals the inductance of the unknown inductance $Lx$, and thus the value of the inductance of the unknown inductance can be directly read on the scale 18. By this method the ohmic resistance and the inductance of the unknown inductance are first adjusted and neutralized, respectively, and then the variable inductance, which has the same ohmic resistance as the unknown inductance because of the adjustment of the ohmic resistance of the arm of the bridge in which the latter is included, is substituted for the unknown inductance, after which the variable inductance is varied until the same effect is produced as was produced by the unknown inductance, whereby an accurate measure of the amount of the unknown inductance is quickly and easily obtained. The procedure is the same when the ohmic resistance of the unknown inductance is greater than the ohmic resistance of the variable inductance, except that the member 30 is swung in a counterclockwise direction, whereby, as previously explained, equal amounts of extra resistance are put in series with the non inductive resistance 7 and with the variable inductance $Lv$, after which the method of operation is the same as in the preceding case.

If it should be found that the amount of the unknown inductance is too great for the range of the instrument when the capacity is in the zero position the amount of capacity C can be varied by moving its controlling arm until the range of the instrument is changed to such an extent that the variable inductance is able to measure the inductance of the unknown inductance L$x$. In accordance with my invention inductance may also be measured by a second method, which is simple and rapid, and which may be carried out by means of the instrument shown in Fig. 3. In this second method the variable inductance is not used, but the effect of the unknown inductance is counteracted by a variable capacity connected to the bridge and provided with a direct reading scale graduated to give directly the value of the unknown inductance. In this method one arm of the bridge is formed of the unknown inductance, with a variable compensating resistance in series with it, and the diagonally opposite arm is shunted by a variable capacity provided with a scale. By means of the compensating resistance the effective resistance of the arm containing the unknown inductance is adjusted to the proper value, and then, by varying the variable capacity in shunt to the diagonally opposite arm, the effect of the unknown inductance upon the bridge is counteracted, whereupon the value of the unknown inductance may be read off upon the scale of the variable capacity.

To measure inductance by the second method above described by means of the instrument shown in Fig. 3 some slight changes are made in the connections. The switch 41 between the compensating resistance 11 and the variable inductance L$v$ is shifted to the contact 42, thereby disconnecting the variable inductance from the bridge and connecting the compensating resistance to the binding post 43. For the variable condenser C, I substitute a variable capacity or condenser C$v$ having a scale 50 graduated to read in terms of inductance. This substitution may be made in any suitable way, preferably by means of two binding posts 44 mounted on the top of the box in some convenient place, one post being connected with the switch 15 and the other with the bridging circuit. By disconnecting the variable condenser C from the binding posts and then connecting to the posts the leads of the variable capacity the substitution may easily be made. In this way a variable capacity of any desired size may be used, as it need not be mounted in the box of the instrument, but may be placed in a convenient position near the instrument and connected to the binding posts 44 by long leads. With the instrument adjusted in this manner the unknown inductance is introduced into one arm of the bridge by being connected to the binding post 43, and to the right hand binding post 25, in series with the compensating resistance 11 and the switch 26. By manipulation of the compensating resistance and of the switch arm 30, if necessary, the effective resistance of the arm containing the unknown inductance is adjusted to the proper amount, and then the inductance is measured by varying the variable capacity connected to the binding posts 44 until the effect of the inductance on the bridge is counteracted, as shown by the sound in the telephone 12, whereupon the amount of the inductance may be read off upon the scale of the variable capacity.

My invention may be embodied in many other forms than those described and I therefore do not limit myself to the precise arrangement disclosed except in so far as it is limited by the scope of the annexed claims.

What I claim as new and desire to secure by Letters Patent of the United States, is:—

1. The method of measuring capacity by means of a bridge comprising two parallel circuits connected to each other at intermediate points through an indicator, which consists in applying a rapidly varying potential to the terminals of said circuits, connecting the capacity to be measured to one circuit on one side of the intermediate point thereof, counteracting the effect of said capacity by introducing inductance into the other circuit on the other side of the intermediate point of the other circuit, adjusting the effective resistance of said other circuit by means of an auxiliary variable resistance to compensate for variations due to the rapidly varying current, and determining directly the value of the capacity from the amount of inductance introduced.

2. The method of measuring capacity by means of a bridge which consists in affecting by means of the capacity to be measured the distribution of potential on one arm of the bridge when rapidly varying potential is applied to the bridge, counteracting the effect of said capacity by varying the amount of inductance in the opposite arm of the bridge while maintaining constant the effective resistance of said opposite arm, and determining directly the value of the capacity from the variation in the amount of the inductance.

3. The method of measuring capacity by means of a bridge having in one arm an inductance variable at will, which consists in applying rapidly varying potential to the bridge while the capacity to be measured is connected in shunt to the opposite arm of the bridge, and varying said inductance while maintaining its effective resistance constant, whereby the effect of said capacity is counteracted and a direct measure of said capacity is obtained from the variation in said inductance.

4. The method of measuring capacity by means of a bridge having in one arm a variable inductance comprising a coil and a mass of iron relatively movable at will, which consists in applying a rapidly varying potential to the bridge while the capacity to be measured is connected in shunt to the non adjacent arm of the bridge, and varying said inductance to counteract the effect of said capacity while maintaining constant the effective resistance of said first mentioned arm regardless of changes in relative position of said coil and mass of iron, whereby a direct measure of said capacity is obtained.

5. The method of measuring inductance by means of a bridge which consists in introducing into one arm of the bridge the inductance to be measured, applying rapidly varying potential to the bridge, counteracting the effect of said inductance by means of capacity in another arm of the bridge, substituting for the arm containing said inductance an arm of equal ohmic resistance containing a standard inductance variable at will, and reproducing by variations of said variable inductance the effect of the inductance to be measured.

6. The method of measuring inductance by means of a bridge having an arm shunted by capacity, which consists in introducing into the opposite arm of the bridge the inductance to be measured, applying rapidly varying potential to the bridge, adjusting the relative ohmic resistances of said opposite arm and an adjoining arm to produce a minimum effect on the indicator of the bridge, counteracting the effect of the inductance of the inductance to be measured by adjusting the effect of said capacity, substituting for said inductance to be measured a standard inductance variable at will, making the ohmic resistance of said standard inductance equal to the ohmic resistance of the inductance to be measured, and varying the inductance of said standard inductance to produce a minimum effect on the indicator of the bridge.

7. The method of measuring inductance by means of a bridge which consists in modifying by the inductance to be measured the potential applied to one terminal of the indicator of the bridge when rapidly varying potential is applied to the bridge, counteracting the effect of said inductance by capacity connected to the other terminal of the indicator, substituting for said inductance a standard variable inductance and maintaining unchanged the ohmic resistance of the bridge, and varying the inductance of said standard inductance until the effect of the inductance to be measured is reproduced.

8. The method of measuring inductance by means of a bridge which consists in introducing into one arm of the bridge the inductance to be measured, counteracting the effect of said inductance by capacity in shunt to the opposite arm, applying rapidly varying potential to the bridge, adjusting the relative ohmic resistances of said first mentioned arm and of an adjoining arm to bring the bridge into ohmic balance, substituting for said first mentioned arm a standard variable inductance of equal ohmic resistance, and reproducing by variations in said standard inductance the effect of the inductance to be measured.

9. The method of measuring inductance by means of a bridge which consists in shunting one arm of the bridge by capacity, introducing into the opposite arm the inductance to be measured, applying rapidly varying potential to the bridge, adjusting the ohmic resistance of said opposite arm and counteracting the effect of the inductance of the inductance to be measured by adjusting the effect of said capacity to bring the bridge into balance, substituting for said adjusted arm an arm of equal ohmic resistance containing a standard inductance variable at will, and varying the inductance of said standard inductance until the effect of the inductance to be measured is reproduced.

10. The method of measuring inductance by means of a bridge which consists in shunting one arm of the bridge by capacity, introducing into the opposite arm the inductance to be measured, applying rapidly varying potential to the bridge, adding to the arm adjoining the arm containing said inductance sufficient resistance to effect the ohmic balance of the bridge and simultaneously adding an equal amount of resistance to a second opposite arm containing a standard inductance variable at will, counteracting the effect of the inductance of the inductance to be measured by adjusting the effect of said capacity, substituting for the opposite arm containing the inductance to be measured the second opposite arm containing the standard inductance, and varying the inductance of said standard inductance until the effect of the inductance to be measured is reproduced.

11. The method of measuring inductance by means of a bridge, which consists in forming one arm of the bridge of the unknown inductance connected in series with a variable resistance, counteracting the effect of said inductance by means of a variable capacity in the opposite arm of the bridge, and determining directly the value of said inductance from the amount of capacity required to counteract said inductance.

12. The method of measuring inductance by means of a bridge, which consists in introducing into one arm of the bridge the inductance to be measured, applying rapidly varying potential to the bridge, adjusting the effective resistance of said arm, introducing into the bridge sufficient capacity to counteract the effect of said inductance, and determining directly the value of said inductance from the amount of capacity thus introduced.

13. The method of measuring by means of apparatus using alternating or varying currents which consists in neutralizing variations in the effective resistance due to the alternating or varying current by an adjustable resistance.

14. The method of increasing the sensitivity of measuring apparatus using alternating or varying currents which consists in compensating by means of an auxiliary variable resistance for the variations in effective resistance resulting from the alternating or varying current.

15. The method of measuring by means of apparatus using alternating or varying currents, and a telephone as an indicator, which consists in maintaining constant by an adjustable resistance the effective resistance due to the alternating or varying current.

16. The method of measuring by means of apparatus using alternating or varying currents and inductance containing iron, which consists in counteracting by an auxiliary resistance the effect of the iron on the effective resistance of the apparatus with alternating or varying current.

17. The method of measuring capacity or inductance, which consists in comparing with a standard inductance the capacity or inductance to be measured, and compensating by a resistance variable at will for variations in the effective resistance of the inductance.

18. An electrical measuring instrument for measuring capacity, comprising a Wheatstone bridge of which one arm is shunted by a circuit which may be completed by the capacity to be measured, and the opposite arm comprises a variable inductance having a coil and a member of magnetic material in inductive relation to said coil, said coil and said member being relatively movable, and means for maintaining constant the impedance of said non-adjacent arm containing said variable inductance.

19. An electrical measuring instrument for measuring capacity comprising a Wheatstone bridge of which one arm is shunted by a circuit having means by which the capacity to be measured may be connected in said circuit, and the opposite arm comprises a variable inductance having a coil and a member of magnetic material in inductive relation to said coil, said coil and said member being relatively movable, and a variable compensating resistance in series with said variable inductance for at will varying the impedance of said non-adjacent arm.

20. An electric bridge having one arm shunted by a shunt circuit containing a rheostat, a capacity, means for introducing the capacity into said circuit, the indicator of the bridge being connected to said shunt circuit between said rheostat and said means, an opposite arm containing a variable inductance comprising relatively movable members and variable between known limits by movement of said members, and a scale member having a plurality of scales associated with said inductance to measure the relative movement of said members, said scale member being connected to said rheostat to bring for each position of said rheostat a corresponding scale into proper relation to said inductance.

21. An electric bridge comprising one arm shunted by a capacity, two other arms connected to said first mentioned arm, two parallel circuits, one containing a standard inductance variable at will and the other having means whereby an unknown inductance may be connected in said second circuit, and means for at will connecting either of said parallel circuits between said two other arms to form the fourth arm of the bridge.

22. An electric bridge comprising one arm shunted by a capacity, two other arms connected directly to said first mentioned arm, two parallel circuits, the first of said circuits containing a standard inductance variable at will and a compensating variable resistance in series with said inductance and the second circuit having means whereby an unknown inductance may be connected in said circuit, means in each of said circuits whereby the impedance of the circuit may be varied, and means whereby at will either one or the other of said parallel circuits may be connected to said two other arms to form the fourth arm of the bridge.

23. An electric bridge comprising one arm shunted by a capacity, and two other arms connected directly to said first mentioned arm, and to each other through either of two parallel circuits, the first of said circuits containing a standard inductance variable at will and a compensating variable resistance in series with said inductance and the second circuit having means whereby an unknown inductance may be connected in circuit; a resistance in series in each circuit variable at will to adjust the impedance of the circuit, and interlocked inductance transfer switches whereby at will either one or the other of said parallel circuits may be connected to form the fourth arm of the bridge.

24. An electric bridge comprising one arm shunted by a capacity and two other arms connected directly to said first mentioned arm, and to each other through either of two parallel circuits, the first of said circuits containing a standard inductance variable at will and a compensating variable resistance in series with said inductance, and the second circuit having means whereby an unknown inductance may be connected in circuit, adjusting means for simultaneously introducing equal amounts of resistance into said first circuit in series with said variable inductance and into one of said two other arms, and interlocking inductance transfer switches whereby at will either one or the other of said parallel circuits may be connected to form the fourth arm of the bridge.

25. An electric bridge comprising one arm shunted by a capacity and two other arms connected directly to said first mentioned arm, and to each other through either of two parallel circuits, the first of said circuits containing a standard inductance variable at will and a compensating variable resistance in series with said inductance, and the second circuit having means whereby an unknown inductance may be connected in circuit, an adjuster connected to said parallel circuits and to one of the adjoining arms for introducing into said first circuit and into said adjoining arm equal amounts of resistance when said adjuster is adjusted in one direction and for introducing resistance into said second circuit only when adjusted in the opposite direction, and interlocked inductance transfer switches whereby at will either one or the other of said parallel circuits may be connected to form the fourth arm of the bridge.

26. An electric bridge comprising one arm shunted by a shunt circuit containing a capacity and an adjustable variable resistance in series, the indicator of the bridge being connected to said shunt circuit between said capacity and said variable resistance, and means whereby either of two parallel circuits of equal impedance may be connected to form the opposite arm of the bridge, one of said parallel circuits containing a standard inductance variable at will and the other containing the inductance to be measured.

27. An electric bridge for measuring capacity and inductance comprising an arm shunted by one shunt circuit containing capacity and by a second shunt circuit, a capacity to be measured, means whereby the capacity to be measured may be inserted in said second shunt circuit, capacity transfer switches whereby either of said shunt circuits may be connected in shunt to said arm of the bridge, two other arms connected to said first mentioned arm, parallel circuits of substantially equal impedance between said two other arms, one of said circuits containing a standard inductance variable at will and the other containing means whereby an inductance to be measured may be connected therein, inductance transfer switches whereby either of said parallel circuits may be connected to form the opposite arm of said bridge, and means for interlocking all said transfer switches to permit said parallel circuits to be interchanged only when the first of said shunt circuits is connected in shunt to the first mentioned arm of the bridge.

28. An apparatus for measuring capacity and inductance comprising two parallel circuits connected to each other at intermediate points through an indicator thereby forming four arms of an electric bridge, interlocked capacity transfer switches for controlling shunt circuits to one of the arms of said bridge, interlocked inductance transfer switches for interchanging parallel circuits containing inductance to cause either of said parallel circuits to form the opposite arm of the bridge, and means for interlocking all of said transfer switches to permit said parallel circuits to be interchanged only when said capacity transfer switches are in a predetermined position.

29. An apparatus for measuring capacity and inductance comprising two parallel circuits connected to each other at intermediate points through an indicator thereby forming four arms of an electric bridge, interlocked capacity transfer switches for controlling shunt circuits to one of the arms of said bridge, interlocked inductance transfer switches for interchanging parallel circuits containing inductance to cause either of said parallel circuits to form the opposite arm of the bridge, and a lost motion interlock between said capacity transfer switches and said inductance transfer switches which permits one of said parallel circuits to form the opposite arm of the bridge only when said capacity transfer switches are in a predetermined position.

30. An apparatus for measuring capacity and inductance comprising two parallel circuits connected to each other at intermediate points through an indicator thereby forming four arms of an electric bridge, interlocked capacity transfer switches for controlling shunt circuits to one of the arms of said bridge, interlocked inductance transfer switches for interchanging parallel circuits containing inductance to cause either of said parallel circuits to form the opposite arm of the bridge, and a mechanical interlock between said switches whereby movement of said inductance transfer switches to cause one of said parallel circuits to form the fourth arm of the bridge automatically connects one predetermined shunt circuit to the first mentioned arm of the bridge and simultaneously disconnects the other shunt circuit.

31. In an electric bridge, the combination with a non-inductive arm, and two adjoining parallel circuits with means whereby either of said circuits may be connected to said arm to form the adjoining arm of the bridge, of a movable adjusting member, impedances varied in amount by movement of said member, and connections to said arm and to said parallel circuits whereby movement of said member in one direction increases the impedance of one of said parallel circuits and movement of said member in the other direction increases by equal amounts the impedance of the second parallel circuit and of said non-inductive arm.

32. In an electric bridge, the combination with a non-inductive arm, and two adjoining parallel circuits with means whereby either of said circuits may be connected to said arm to form the adjoining arm of the bridge, of an adjuster comprising a movable regulating member, two variable resistances controlled by said member, one of said resistances being connected to one of said parallel circuits and the second resistance being connected in series between the second parallel circuit and said non inductive arm, and a contact bar connected to said non-inductive arm and positioned to be engaged by said member while said member engages the second of said resistances and to be disengaged from said member while said member engages the first of said resistances, whereby the same amount of impedance can be simultaneously inserted in the first of said parallel circuits and in the circuit of said non-inductive arm when the contact bar engages said member and impedance can be inserted only in the second of said parallel circuits when the contact bar is disengaged from said member.

33. In an electric bridge, the combination with a non-inductive arm, and two adjoining parallel circuits with means whereby either of said circuits may be connected to said arm to form the adjoining arm of the bridge, a movable adjusting member, an arc shaped resistance and an arc shaped contact bar on each side of the axis of said member and mounted concentric therewith in position to be bridged by said member, an arc shaped lifting contact concentric with one of said resistances and positioned to engage one end of said member and lift it off said resistance but to be outside the path of the other end of said member, said lifting contact and said other resistance being electrically connected to said non-inductive arm, the contact bar of said other resistance being electrically connected to the first resistance and to the first of said parallel circuits, and the contact bar of the first resistance being electrically connected to the other resistance and to the second of said parallel circuits.

34. An electric bridge comprising one arm shunted by a capacity, two other arms connected to said first mentioned arm, and an inductance and a variable resistance connected in series to form the fourth arm of the bridge.

35. An electric bridge comprising a variable resistance and means for at will connecting an unknown inductance in series with said resistance to cause said inductance and said resistance to form one arm of the bridge, and means for connecting a capacity variable at will in shunt to the opposite arm to counteract the effect of said inductance, and thereby indicate directly the value of said inductance.

36. An electric bridge comprising a variable resistance and means for at will connecting an unknown inductance in series with said resistance to cause said inductance and said resistance to form one arm of the bridge, and a capacity variable at will connected to the opposite arm to counteract the effect of said inductance upon the bridge.

In witness whereof, I have hereunto set my hand this 31st day of October, 1912.

CHARLES A. HOXIE.

Witnesses:
HELEN ORFORD,
MARGARET E. WOOLEY.